(12) United States Patent
Kanda et al.

(10) Patent No.: US 11,715,996 B2
(45) Date of Patent: Aug. 1, 2023

(54) FAN MOTOR WITH HEATSINK AND OPPOSED GUIDE FOR COOLING AIRFLOW

(71) Applicant: DENSO CORPORATION, Kariya (JP)

(72) Inventors: Hidenori Kanda, Kariya (JP); Ko Nejigane, Kariya (JP)

(73) Assignee: DENSO CORPORATION, Kariya (JP)

( * ) Notice: Subject to any disclaimer, the term of this patent is extended or adjusted under 35 U.S.C. 154(b) by 396 days.

(21) Appl. No.: 17/046,614

(22) PCT Filed: Mar. 22, 2019

(86) PCT No.: PCT/JP2019/012172
§ 371 (c)(1),
(2) Date: Oct. 9, 2020

(87) PCT Pub. No.: WO2019/198466
PCT Pub. Date: Oct. 17, 2019

(65) Prior Publication Data
US 2021/0104934 A1  Apr. 8, 2021

(30) Foreign Application Priority Data

Apr. 12, 2018 (JP) ................. 2018-076856

(51) Int. Cl.
*H02K 5/20* (2006.01)
*H02K 9/06* (2006.01)
(Continued)

(52) U.S. Cl.
CPC ............. *H02K 9/06* (2013.01); *H02K 5/207* (2021.01); *H02K 9/22* (2013.01); *H02K 11/33* (2016.01)

(58) Field of Classification Search
CPC H02K 5/20; H02K 5/207; H02K 9/06; H02K 9/22; H02K 9/227; H02K 11/30; H02K 11/33
See application file for complete search history.

(56) References Cited

FOREIGN PATENT DOCUMENTS

JP    2002112504 A  *  4/2002  .......... F04D 25/082
JP    3426151 B2       7/2003
(Continued)

OTHER PUBLICATIONS

Takahashi, Machine Translation of JP2002112504, Apr. 2002 (Year: 2002).*

(Continued)

*Primary Examiner* — Eric Johnson
(74) *Attorney, Agent, or Firm* — Oliff PLC (57) ABSTRACT

A circuit board includes a board body disposed on the opposite side of a plate-shaped portion of a center piece to a stator, and a heat generating element mounted to a surface on the plate-shaped portion side of the board body and disposed inside a radial direction range of a rotor housing. A heat-dissipation portion of a heatsink is on the plate-shaped portion side of the circuit board such that the heat-dissipation portion contacts the heat generating element either directly or through a thermally conductive material. A guide that opposes the heat-dissipation portion in an axial direction of a motor unit is formed at the plate-shaped portion. The guide forms an airflow guiding path between itself and the heat-dissipation portion, the airflow guiding path being shaped so as to guide air taken in through an air intake port from the radial direction outside toward a center of the motor unit.

3 Claims, 4 Drawing Sheets

(51) Int. Cl.
    *H02K 9/22*      (2006.01)
    *H02K 11/33*     (2016.01)

(56) References Cited

FOREIGN PATENT DOCUMENTS

| JP | 4102514 B2   | 6/2008  |
|----|--------------|---------|
| JP | 2010-130802 A | 6/2010  |
| JP | 2015-057014 A | 3/2015  |
| JP | 2015-092799 A | 5/2015  |
| JP | 2015-133843 A | 7/2015  |
| JP | 2017-150451 A | 8/2017  |
| JP | 2017-175769 A | 9/2017  |
| JP | 2017-184547 A | 10/2017 |
| JP | 2017-195663 A | 10/2017 |

OTHER PUBLICATIONS

Apr. 23, 2019 International Search Report issued in International Patent Application No. PCT/JP2019/012172.

* cited by examiner

FAN MOTOR WITH HEATSINK AND OPPOSED GUIDE FOR COOLING AIRFLOW

TECHNICAL FIELD

The present disclosure relates to a fan motor for rotating a fan.

BACKGROUND ART

The following are known examples of fan motors: Japanese Patent Application Laid-Open (JP-A) Nos. 2017-184547, 2017-175769, 2017-150451, 2015-57014, and Japanese Patent Nos. 4102514 and 3426151.

Namely, conventional fan motors include a rotor provided with a tube-shaped rotor housing that is closed at one end, a stator housed inside the rotor housing, a motor holder provided at a periphery of the rotor housing, a center piece provided with a plate-shaped portion that opposes an opening in the rotor housing, and a circuit board disposed on the opposite side of the plate-shaped portion from the stator.

In such fan motors, a board body of the circuit board is mounted with a heat generating element. The heat generating element is a through hole-mounted component provided with a terminal portion and a body portion. The body portion of the heat generating element is fixed to the board body through the terminal portion that extends toward a radial direction outside of the rotor housing, such that the body portion is disposed at the radial direction outside of the rotor housing. The body portion of the heat generating element is either contacted by a heatsink, or is contacted by the heatsink through a thermally conductive material.

The motor holder is formed with an air intake port, and the heatsink is disposed in an airflow guiding path leading from the air intake port to the opening in the rotor housing. When air that has been taken in through the air intake port accompanying rotation of the fan flows along the airflow guiding path, the heat generating element is cooled by the heatsink.

SUMMARY OF INVENTION

Technical Problem

However, in a case in which, for example, a heat generating element is a surface-mounted component, the heat generating element does not include a terminal portion extending toward the radial direction outside of the rotor housing. The heat generating element may thus be disposed inside the radial direction range of the rotor housing. In conventional fan motors, air taken in through the air intake port reaches the opening in the rotor housing and then flows inside the rotor housing through this opening. Accordingly, when such a heat generating element is disposed inside the radial direction range of the rotor housing, it may not be possible to supply sufficient air to the heat generating element and the heatsink, resulting in insufficient cooling of the heat generating element.

In consideration of the above circumstances, an object of the present disclosure is to provide a fan motor capable of securing cooling performance with respect to a heat generating element, even if the heat generating element is disposed inside a radial direction range of a rotor housing.

Solution to Problem

A fan motor according to a first aspect of the present disclosure includes: a motor unit that includes a rotor provided with a tube-shaped rotor housing closed at one end and that also includes a stator housed inside the rotor housing; a motor holder that is provided at a periphery of the rotor housing and that includes an air intake port; a center piece that includes a plate-shaped portion opposing an opening in the rotor housing; a circuit board that includes a board body disposed on an opposite side of the plate-shaped portion from the stator, and a heat generating element mounted to a surface on the plate-shaped portion side of the board body and disposed inside a radial direction range of the rotor housing; a heatsink that includes a heat-dissipation portion disposed on the plate-shaped portion side of the circuit board so as to contact the heat generating element either directly or through a thermally conductive material; and a guide that is formed at the plate-shaped portion, that opposes the heat-dissipation portion in an axial direction of the motor unit, and that forms an airflow guiding path between the guide and the heat-dissipation portion, the airflow guiding path being shaped so as to guide air taken in through the air intake port from a radial direction outer side of the motor unit toward a center of the motor unit.

In this fan motor, the heat-dissipation portion of the heatsink is disposed on the plate-shaped portion side of the circuit board, and the heat-dissipation portion contacts the heat generating element either directly or through the thermally conductive material. The guide that opposes the heat-dissipation portion in the axial direction of the motor unit is formed at the plate-shaped portion. The guide forms the airflow guiding path between itself and the heat-dissipation portion, the airflow guiding path being shaped so as to guide air taken in through the air intake port from the radial direction outside toward the center of the motor unit.

Accordingly, since the air flows along the airflow guiding path, this air can be suppressed from flowing through the opening in the rotor housing to the inside of the rotor housing. Air can thus be supplied to the heat-dissipation portion of the heatsink that forms the airflow guiding path, thereby enabling cooling performance with respect to the heat generating element to be secured, even when the heat generating element is disposed inside the radial direction range of the rotor housing.

A fan motor according to a second aspect of the present disclosure is the fan motor according to the first aspect, wherein the plate-shaped portion is formed with an air supply port that is positioned toward the center of the motor unit relative to the guide, that is open toward the stator, and that supplies air guided by the airflow guiding path to the stator.

In this fan motor, the plate-shaped portion is formed with the air supply port that is positioned toward the center of the motor unit relative to the guide and that is open toward the stator. The air guided by the airflow guiding path is supplied to the stator through the air supply port. The stator can thus be cooled utilizing the air guided by the airflow guiding path, thus enabling cooling performance with respect to the stator as well as the cooling performance with respect to the heat generating element to be secured.

A fan motor according to a third aspect of the present disclosure is the fan motor according to the first aspect or the second aspect, wherein the guide projects further toward the rotor housing than an opposing face of the plate-shaped portion opposing the opening in the rotor housing.

In this fan motor, the guide projects further toward the rotor housing than the opposing face of the plate-shaped portion that opposes the opening in the rotor housing. This enlarges a spacing between the guide and the heat-dissipation portion, thus enabling the flow volume of air flowing into the airflow guiding path to be increased, and thereby enabling the cooling performance with respect to the heat generating element to be improved.

DESCRIPTION OF EMBODIMENTS

Explanation follows regarding an exemplary embodiment of the present disclosure.

Figure 1:
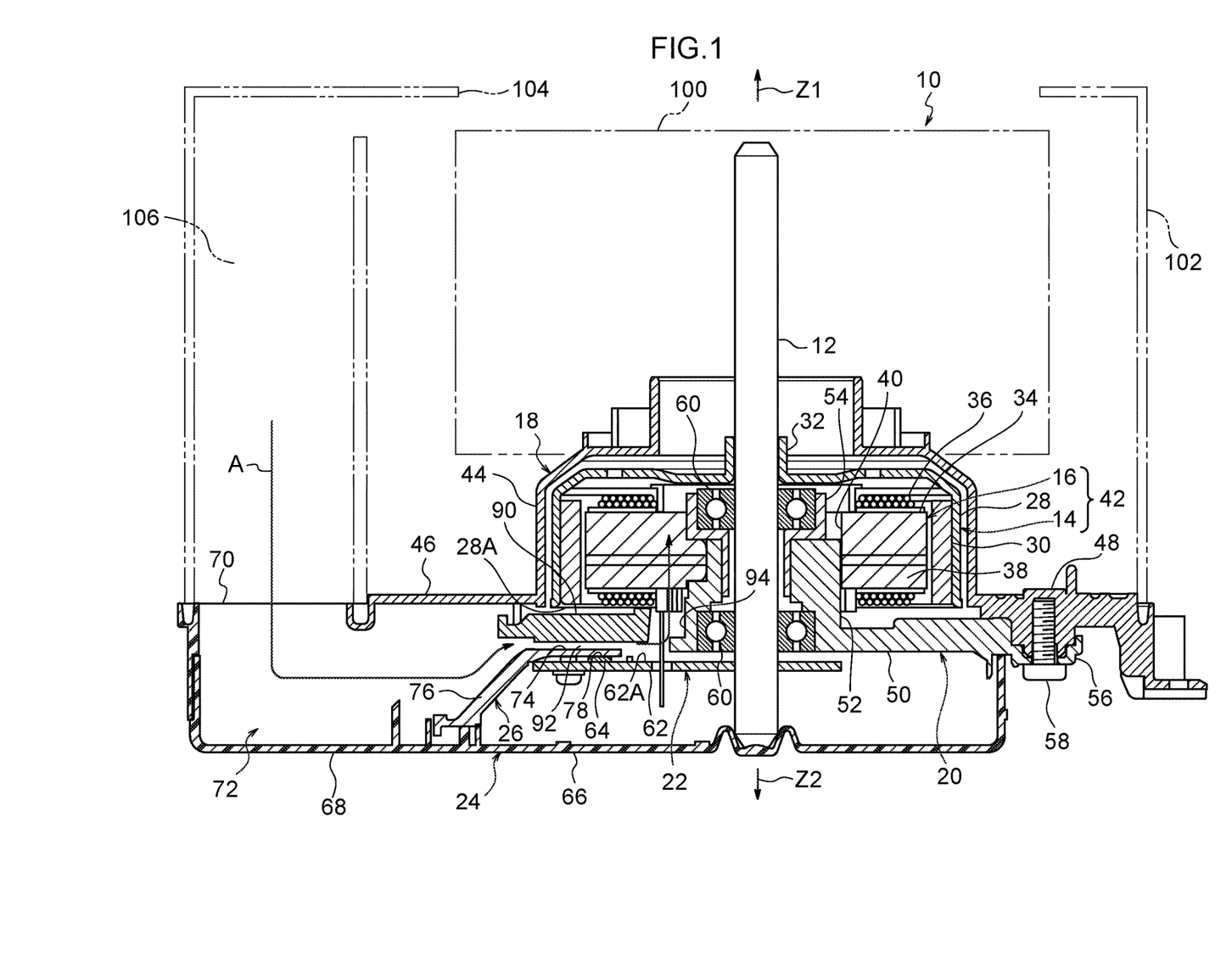
FIG. 1 is a vertical cross-section illustrating a fan motor according to an exemplary embodiment.

A fan motor 10 of the present exemplary embodiment illustrated in FIG. 1 is preferably employed in an air blower device installed in a vehicle such as a passenger car. The fan motor 10 includes a motor shaft 12, a rotor 14, a stator 16, a motor holder 18, a center piece 20, a circuit board 22, a circuit case 24, and a heatsink 26. Note that in the drawings, the arrow Z1 indicates one axial direction side of the fan motor 10, and the arrow Z2 indicates the other axial direction side of the fan motor 10.

The rotor 14 includes a circular tube-shaped rotor housing 28 that is closed at one end and includes an opening 28A. The rotor 14 further includes a rotor magnet 30 that is fixed to the inside of a peripheral wall of the rotor housing 28. A central portion of a ceiling of the rotor housing 28 is formed with a circular cylinder shaped fixing portion 32. The motor shaft 12 is press-fitted inside the fixing portion 32. A leading end portion of the motor shaft 12 projects to the one axial direction side of the rotor housing 28.

The stator 16 is housed inside the rotor housing 28. The stator 16 is disposed at the radial direction inside of the rotor magnet 30 so as to oppose the rotor magnet 30. The stator 16 includes a stator core 34 and plural coils 36. The plural coils 36 are wound around plural teeth 38 formed in a radial pattern around the stator core 34, with resin insulators disposed between the coils 36 and the teeth 38.

A through hole 40 is formed penetrating a central portion of the stator core 34 in the axial direction of the stator core 34. The overall stator 16, including the stator core 34 and the plural coils 36, has an annular shape. The motor shaft 12, the rotor 14, and the stator 16 described above configure a motor unit 42, this being a brushless motor.

The motor holder 18 is, for example, made from resin, and is provided at a periphery of the rotor housing 28. The motor holder 18 includes a circular cylinder portion 44 that surrounds the periphery of the rotor housing 28, and an annular portion 46 that spreads from the circular cylinder portion 44 toward the radial direction outside of the circular cylinder portion 44. The annular portion 46 is formed in an annular plate shape with a plate thickness direction in the axial direction of the rotor housing 28. Join portions 48 that are fixed to an attachment counterpart such as a vehicle body are formed at plural locations around the circumferential direction of the annular portion 46.

The center piece 20 is, for example, made from resin. The center piece 20 includes a plate-shaped portion 50 opposing the opening 28A in the rotor housing 28, a circular cylinder shaped support portion 52 projecting from a central portion of the plate-shaped portion 50 toward the stator 16, and a circular cylinder shaped support member 54 assembled to the support portion 52 from the one axial direction side of the support portion 52. The plate-shaped portion 50 is formed with its plate thickness direction in the axial direction of the motor unit 42. The plate-shaped portion 50 has a size capable of opposing the entire opening 28A in the rotor housing 28. The plate-shaped portion 50 is formed with joined-to portions 56 at positions corresponding to the join portions 48 described above. The join portions 48 and the joined-to portions 56 are joined together using bolts 58 in order to assemble the motor holder 18 to the center piece 20.

A leading end portion of the support portion 52 is press-fitted inside the stator core 34 formed in a ring shape, such that the stator 16 is supported by the center piece 20. Moreover, respective bearings 60 are housed in the support portion 52 and the support member 54 provided to the center piece 20, and the motor shaft 12 is press-fitted inside the bearings 60. The motor shaft 12 is thus supported by the support portion 52 and the support member 54 through the respective bearings 60, such that the rotor 14 is capable of rotating relative to the center piece 20 and the stator 16.

The circuit board 22 includes a plate-shaped board body 62 disposed on the opposite side of the plate-shaped portion 50 to the stator 16, and heat generating elements 64 mounted to a surface 62A on the plate-shaped portion 50 side of the board body 62. The board body 62 is disposed with its plate thickness direction in the axial direction of the motor unit 42. The heat generating elements 64 are, for example, metal oxide semiconductor field effect transistors (MOSFETs). The heat generating elements 64 are, for example, surface-mounted components.

Figure 2:
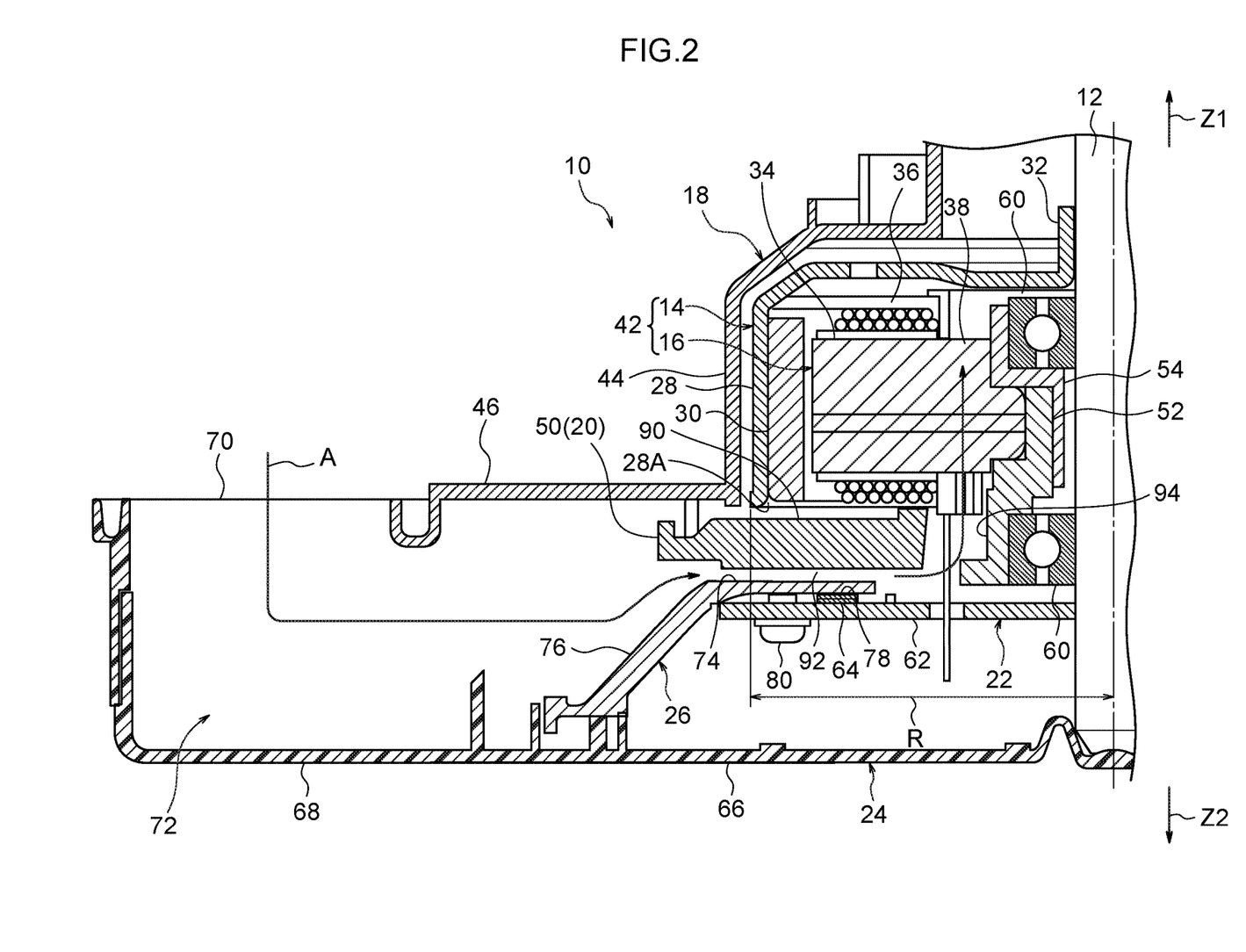
FIG. 2 is an enlarged view of a heatsink illustrated in FIG. 1 and the vicinity thereof.

As illustrated in FIG. 2, each of the heat generating elements 64 is mounted to the surface of the surface 62A on the plate-shaped portion 50 side of the board body 62. The heat generating elements 64 are thus disposed inside a radial direction range R of the rotor housing 28. Being inside the radial direction range R of the rotor housing 28 corresponds to being further toward the radial direction inside than the peripheral wall of the rotor housing 28.

Suppose that each of the heat generating elements 64 were a through hole-mounted component including a terminal portion and a body portion. In such cases, the terminal portion of the heat generating element 64 might extend toward the radial direction outside of the rotor housing 28 such that the corresponding body portion is disposed at the radial direction outside of the rotor housing 28.

However, in the present exemplary embodiment, the heat generating elements 64 are surface-mounted components that do not include a terminal portion extending toward the radial direction outside of the rotor housing 28. The heat generating elements 64 are therefore disposed inside the radial direction range R of the rotor housing 28. The heat generating elements 64 are each formed in a flat plate shape, and are mounted to the surface of the board body 62 in a state superimposed on the board body 62.

The circuit board 22 has a function of controlling excitation switching of the coils 36. A rotating magnetic field is produced in the stator 16 as a result of the circuit board 22 controlling excitation switching of the coils 36. Producing this rotating magnetic field in the stator 16 causes attracting and repelling forces to act between the stator 16 and the rotor 14, thereby rotating the rotor 14.

The circuit case 24 is formed in a flattened container shape, and is assembled to the plate-shaped portion 50 in a state in which an opening in the circuit case 24 faces toward the plate-shaped portion 50. The circuit case 24 includes a bottom wall 66 that is disposed on the opposite side of the circuit board 22 to the plate-shaped portion 50, and that opposes the circuit board 22. The circuit board 22 described above is housed in a space between the bottom wall 66 and the plate-shaped portion 50.

An extension portion 68 is formed to the circuit case 24 and the motor holder 18 described above so as to extend out toward the radial direction outside of the motor unit 42. The extension portion 68 is formed in a duct shape. A leading end portion of the extension portion 68 is formed with an air intake port 70. The air intake port 70 is formed in the motor holder 18 and is open toward the one axial direction side of the motor unit 42. An air intake flow path 72 is formed inside the extension portion 68. The air intake flow path 72 extends from the air intake port 70 toward the circuit board 22.

The heatsink 26 is formed from a metal such as aluminum with high thermal conductivity. The heatsink 26 includes a heat-dissipation portion 74 disposed on the plate-shaped portion 50 side of the circuit board 22, and an inclined portion 76 extending from the heat-dissipation portion 74 toward the air intake port 70.

Figure 3:
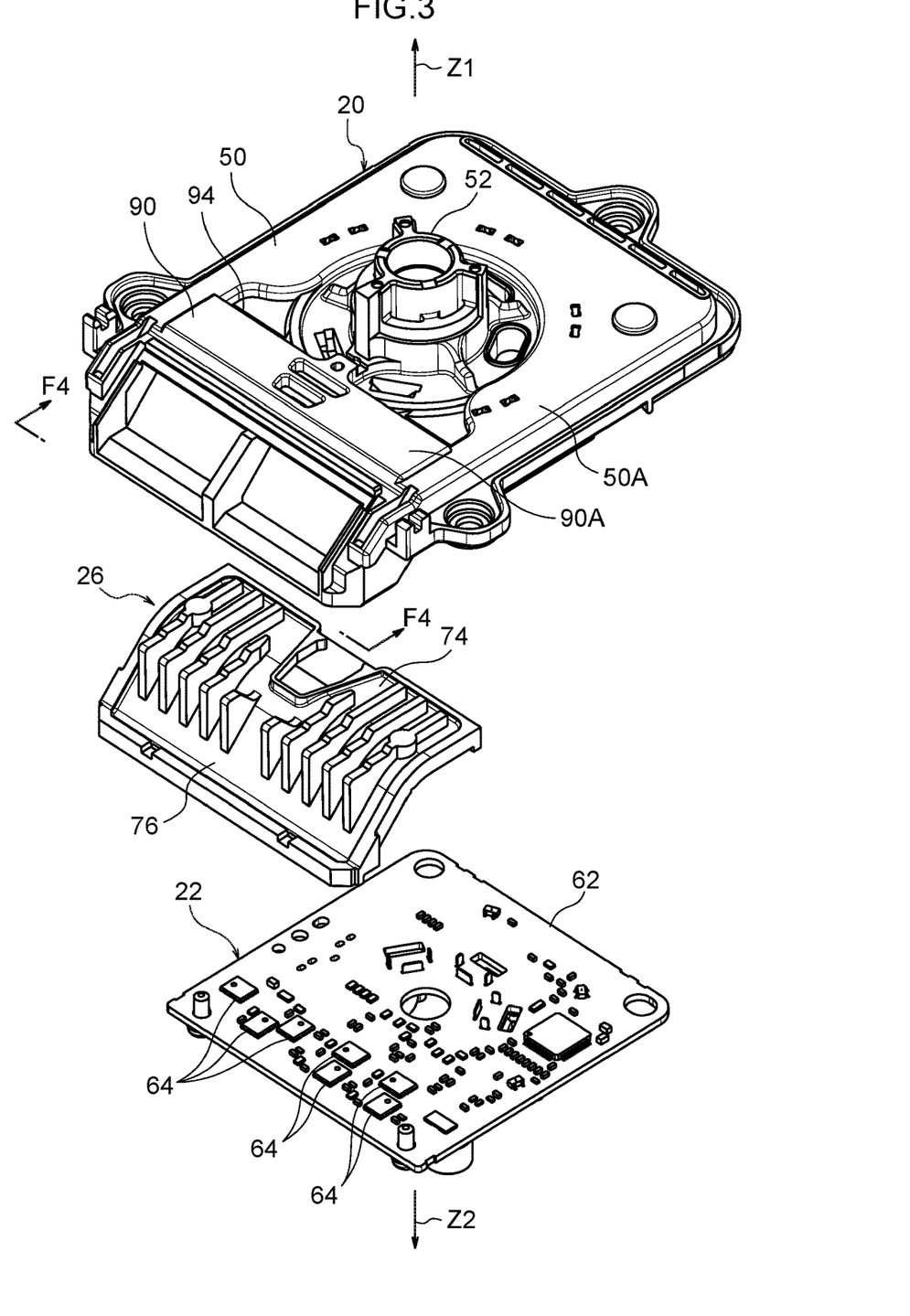
FIG. 3 is an exploded perspective view illustrating a center piece, a circuit board, and the heatsink illustrated in FIG. 1.

The heat-dissipation portion 74 is formed in a plate shape with its plate thickness direction in the axial direction of the motor unit 42. The heat-dissipation portion 74 is in contact with the heat generating elements 64 through a thermally conductive material 78. Plural of the heat generating elements 64 (see FIG. 3) are collectively mounted to the circuit board 22, and the heat-dissipation portion 74 contacts the plural heat generating elements 64 through the thermally conductive material 78. The heat-dissipation portion 74 is fixed to the board body 62 by screws 80.

The inclined portion 76 is angled with respect to the heat-dissipation portion 74, and projects to the outside of the circuit board 22. The inclined portion 76 is inclined with respect to the radial direction of the motor unit 42 so as to extend toward the one axial direction side of the motor unit 42 on progression toward the radial direction inside of the motor unit 42, in other words so as to extend toward the plate-shaped portion 50 on progression toward the circuit board 22. The inclined portion 76 is disposed so as to fill a gap between the bottom wall 66 and the board body 62 on the air intake port 70 side.

As previously mentioned, the fan motor 10 (see FIG. 1) configured as described above is preferably employed in an air blower device installed in a vehicle such as a passenger car. In cases in which the fan motor 10 is employed in an air blower device installed in a vehicle, a fan 100 (for example a sirocco fan) is attached to a leading end portion of the motor shaft 12, and the motor holder 18 is assembled to a duct 102 in which the fan 100 is housed.

The fan 100 is configured to convey air toward the one axial direction side of the fan 100 as it rotates. A blower outlet 104 is formed in the duct 102 at a position opposing the fan 100, and a communication flow path 106 is formed extending in the axial direction of the duct 102 at a side portion of the duct 102. One end portion of the communication flow path 106 is in communication with the inside of the duct 102, and the other end portion of the communication flow path 106 is in communication with the air intake port 70 described above.

When the fan 100 rotates together with the rotor 14 of the fan motor 10, positive pressure is formed on the one axial direction side of the fan 100, while negative pressure is formed on the other axial direction side of the fan 100. When this occurs, as illustrated by arrow A in FIG. 2, air flows into the communication flow path 106, and this air flows through the inside of the communication flow path 106 from the one axial direction side toward the other axial direction side of the duct 102. This air then flows into the air intake flow path 72 through the air intake port 70, and the air that has flowed into the air intake flow path 72 flows toward the heatsink 26.

In conventional fan motors, each of the heat generating elements 64 is configured by a through hole-mounted component including a terminal portion and a body portion. The body portion of the heat generating element 64 is fixed to the board body 62 through the corresponding terminal portion that extends toward the radial direction outside of the rotor housing 28, such that the body portion is disposed at the radial direction outside of the rotor housing 28 (at the radial direction outside of the radial direction range R of the rotor housing 28). The heatsink 26 that contacts the body portions of the heat generating elements 64 is likewise disposed at the radial direction outside of the rotor housing 28.

Namely, in conventional fan motors, the body portions of the heat generating elements 64 and the heatsink 26 are disposed in the air intake flow path 72. The air flowing into the air intake flow path 72 is thus able to cool the body portions of the heat generating elements 64 and the heatsink 26.

However, in the present exemplary embodiment, the heat generating elements 64 are surface-mounted components. The heat generating elements 64 do not include terminal portions extending toward the radial direction outside of the rotor housing 28. The heat generating elements 64 are therefore disposed inside the radial direction range R of the rotor housing 28.

Note that in conventional fan motors, air taken in through the air intake port 70 reaches the opening 28A in the rotor housing 28 and then flows inside the rotor housing 28 through the opening 28A. Accordingly, were the heat generating elements 64 to be disposed inside the radial direction range R of the rotor housing 28, it may not be possible to supply sufficient air to the heat generating elements 64 and the heatsink 26, resulting in insufficient cooling of the heat generating elements 64.

To address this, in the present exemplary embodiment, the following structure is added in order to draw air toward the heat generating elements 64 and the heat-dissipation portion 74 that are disposed inside the radial direction range R of the rotor housing 28. Namely, the plate-shaped portion 50 is formed with a guide 90 opposing the heat-dissipation portion 74 in the axial direction of the motor unit 42. The guide 90 is formed in a plate shape with its plate thickness direction in the axial direction of the motor unit 42.

The guide 90 forms an airflow guiding path 92 between itself and the heat-dissipation portion 74. The airflow guiding path 92 is shaped so as to guide the air taken in through the air intake port 70 from the radial direction outside toward the center of the motor unit 42. The airflow guiding path 92 is in communication with the air intake flow path 72. Accordingly, since the air flows along the airflow guiding path 92, this air is suppressed from flowing through the opening 28A in the rotor housing 28 to the inside of the rotor housing 28. Air is thus supplied to the heat-dissipation portion 74 of the heatsink 26 that forms the airflow guiding path 92, thereby securing cooling performance with respect to the heat generating elements 64, even when the heat generating elements 64 are disposed inside the radial direction range R of the rotor housing 28.

The plate-shaped portion 50 is also formed with an air supply port 94. The air supply port 94 is disposed toward the center of the motor unit 42 relative to the guide 90, and is open toward the stator 16. The air supply port 94 supplies air guided by the airflow guiding path 92 to the stator 16. The air supplied to the stator 16 through the air supply port 94 flows into slots between the plural teeth 38 of the stator 16. The stator 16 is thus cooled utilizing the air guided by the airflow guiding path 92, thus securing the cooling performance with respect to the stator 16 as well as the cooling performance with respect to the heat generating elements 64.

Figure 4:
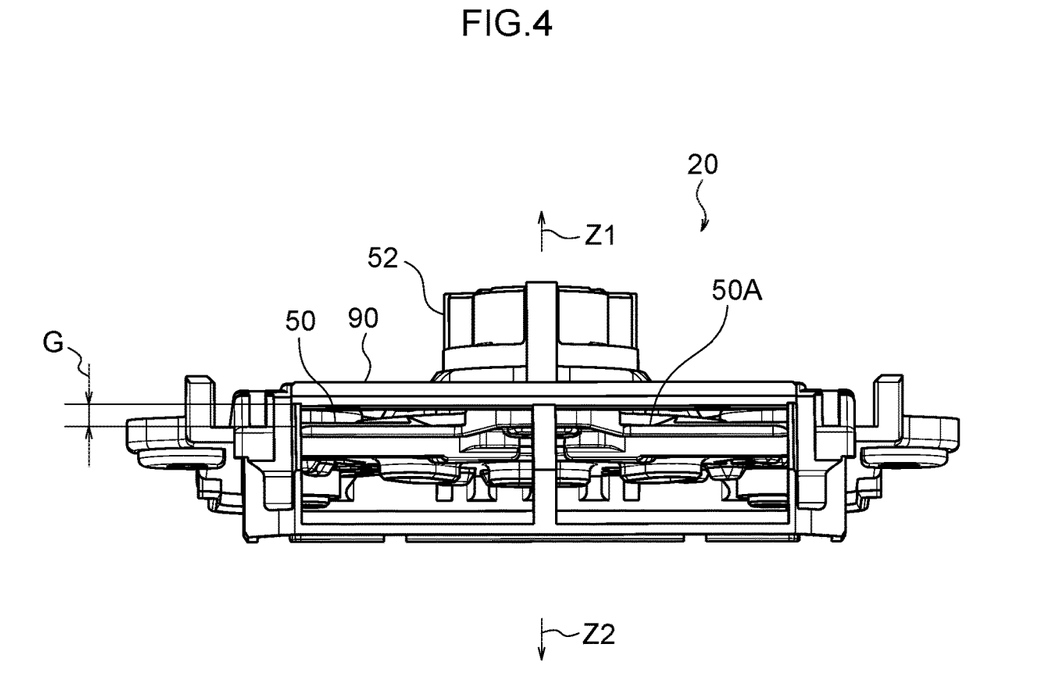
FIG. 4 is a side view illustrating the center piece illustrated in FIG. 1 as viewed in the direction indicated by lines F4-F4 in FIG. 3.

The plate-shaped portion 50 is formed with an opposing face 50A (general face: see FIG. 3 and FIG. 4) that opposes the opening 28A in the rotor housing 28. The guide 90 projects further toward the rotor housing 28 (arrow Z1 side) than the opposing face 50A. Adopting this configuration enlarges a gap G (a spacing along the axial direction of the motor unit 42: see FIG. 4) between the guide 90 and the heat-dissipation portion 74, thus increasing the flow volume of air flowing into the airflow guiding path 92.

Next, explanation follows regarding operation and advantageous effects of the present exemplary embodiment.

As described in detail above and as illustrated in FIG. 2, in the fan motor 10 according to the present exemplary embodiment, the heat-dissipation portion 74 of the heatsink 26 is disposed on the plate-shaped portion 50 side of the circuit board 22, and the heat-dissipation portion 74 contacts the heat generating elements 64 through the thermally conductive material 78. The guide 90 that opposes the heat-dissipation portion 74 in the axial direction of the motor unit 42 is formed at the plate-shaped portion 50. The guide 90 forms the airflow guiding path 92 between itself and the heat-dissipation portion 74, the airflow guiding path 92 being shaped so as to guide air taken in through the air intake port 70 from the radial direction outside toward the center of the motor unit 42.

Accordingly, since air flows along the airflow guiding path 92, air can be suppressed from flowing inside the rotor housing 28 through the opening 28A in the rotor housing 28. This enables air to be supplied to the heat-dissipation portion 74 of the heatsink 26 that forms the airflow guiding path 92, thus enabling cooling performance with respect to the heat generating elements 64 to be secured, even when the heat generating elements 64 are disposed inside the radial direction range R of the rotor housing 28.

Moreover, the plate-shaped portion 50 is formed with the air supply port 94 that is positioned toward the center of the motor unit 42 relative to the guide 90, and that is open toward the stator 16 side. Air that has been guided by the airflow guiding path 92 is supplied to the stator 16 through the air supply port 94. This enables the stator 16 to be cooled utilizing the air guided by the airflow guiding path 92, thus enabling cooling performance with respect to the stator 16 to be secured as well as the cooling performance with respect to the heat generating elements 64.

The guide 90 projects further toward the rotor housing 28 (arrow Z1 side) than the opposing face 50A (see FIG. 3 and FIG. 4) of the plate-shaped portion 50 that opposes the opening 28A in the rotor housing 28. The gap G (see FIG. 4) between the guide 90 and the heat-dissipation portion 74 is thus enlarged, enabling the volume of air flowing into the airflow guiding path 92 to be increased, and thus enabling the cooling performance with respect to the heat generating elements 64 to be improved.

Next, explanation follows regarding modified examples of the present exemplary embodiment.

In the exemplary embodiment described above, the heat-dissipation portion 74 contacts the heat generating elements 64 through the thermally conductive material 78. However, the heat-dissipation portion 74 may contact the heat generating elements 64 directly.

Moreover, in the exemplary embodiment described above, the heat generating elements 64 are configured by surface-mounted components as an example. However, each of the heat generating elements 64 may be configured by a through hole-mounted component including a terminal portion and a body portion. Moreover, heat generating elements 64 configured by through hole-mounted components may be disposed inside the radial direction range R of the rotor housing 28.

In the exemplary embodiment described above, the guide 90 preferably projects further toward the rotor housing 28 (arrow Z1 side) than the opposing face 50A (see FIG. 3 and FIG. 4) of the plate-shaped portion 50 that opposes the opening 28A in the rotor housing 28. However, an opposing face 90A (see FIG. 3) of the guide 90 that opposes the opening 28A in the rotor housing 28 may be formed in the same plane as the opposing face 50A of the plate-shaped portion 50 that opposes the opening 28A in the rotor housing 28.

Although an exemplary embodiment of the present disclosure has been described above, the present disclosure is not limited thereto, and obviously various modifications may be implemented within a range not departing from the spirit of the present disclosure.

The disclosure of Japanese Patent Application No. 2018-076856 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A fan motor comprising:
a motor unit that includes a rotor provided with a tube-shaped rotor housing closed at one end and that also includes a stator housed inside the rotor housing;
a motor holder that includes: (i) a circular cylinder portion that is formed in a tube shape, is closed at one end, and houses the rotor housing; (ii) an annular portion extending toward a radial direction outer side of the circular cylinder portion from a portion of the circular cylinder portion corresponding to an opening in the rotor housing; and (iii) an air intake port;
a center piece that includes a plate-shaped portion opposing the opening in the rotor housing;
a circuit board that includes (i) a board body, which is disposed on an opposite side of the plate-shaped portion from the stator, and (ii) a heat generating element that is mounted to a surface on a plate-shaped portion side of the board body and is disposed inside a radial direction range of the rotor housing;
a circuit case that (i) is disposed on an opposite side of the plate-shaped portion from the stator and (ii) houses the circuit board, the circuit case and the annular portion of the motor holder forming an extension portion that includes an air intake flow path communicating with the air intake port;
a heatsink that includes a heat-dissipation portion disposed on a plate-shaped portion side of the circuit board so as to contact the heat generating element either directly or through a thermally conductive material; and
a guide that (i) is formed at the plate-shaped portion, (ii) opposes the heat-dissipation portion in an axial direction of the motor unit, (iii) is disposed at a position that closes off the opening in the rotor housing, and (iv)

forms an airflow guiding path between the guide and the heat-dissipation portion, the airflow guiding path being shaped so as to guide air taken in through the air intake port and flowing through the air intake flow path from a radial direction outer side of the motor unit toward a center of the motor unit.

2. The fan motor of claim 1, wherein the plate-shaped portion is formed with an air supply port that (i) is positioned toward the center of the motor unit relative to the guide, (ii) is open toward the stator, and (iii) supplies air guided by the airflow guiding path to the stator.

3. The fan motor of claim 1, wherein the guide projects further toward the rotor housing than an opposing face of the plate-shaped portion opposing the opening in the rotor housing.

* * * * *